United States Patent [19]
Fredriksson

[11] Patent Number: 5,851,040
[45] Date of Patent: Dec. 22, 1998

[54] CHAIN COUPLING ASSEMBLY

[75] Inventor: Lars Fredriksson, Åkersberga, Sweden

[73] Assignee: Frenolink Forvaltnings AB, Sweden

[21] Appl. No.: 771,038

[22] Filed: Dec. 20, 1996

[30] Foreign Application Priority Data

Dec. 22, 1995 [SE] Sweden .................................. 9504633

[51] Int. Cl.⁶ .................................................. B66C 1/14
[52] U.S. Cl. .................................... 294/82.11; 294/82.23
[58] Field of Search ............................. 294/74, 75, 82.1,
294/82.11, 82.12, 82.14, 82.17, 82.19–82.23;
24/68 CT, 116 R, 598.3, 598.4, 598.7,
599.1, 600.4, 600.5; 59/85, 86, 93

[56] References Cited

U.S. PATENT DOCUMENTS

| | | | |
|---|---|---|---|
| 2,583,320 | 1/1952 | Brummel | 294/82.1 |
| 3,132,395 | 5/1964 | Luketa | 294/82.17 X |
| 4,134,256 | 1/1979 | Fredriksson | 59/93 |
| 4,144,709 | 3/1979 | Dalferth et al. | 294/82.19 X |
| 4,149,369 | 4/1979 | Smetz | 294/82.1 X |
| 4,280,728 | 7/1981 | Fredriksson | 294/82.11 |

FOREIGN PATENT DOCUMENTS

| | | | |
|---|---|---|---|
| 8966 | 3/1980 | European Pat. Off. | 294/82.19 |
| 92 382 | 10/1983 | European Pat. Off. . | |
| 541069 | 7/1922 | France | 294/82.1 |
| 2826966 | 10/1979 | Germany | 294/82.23 |
| 4115073 | 11/1991 | Germany . | |
| 438601 | 8/1974 | U.S.S.R. | 294/82.11 |
| WO83/03649 | 10/1983 | WIPO . | |

*Primary Examiner*—Johnny D. Cherry
*Attorney, Agent, or Firm*—Quarles & Brady

[57] ABSTRACT

A chain coupling assembly comprising a closed ring member (1) to be coupled to a hoist, e.g. a lifting hook, and at least one chain coupling or shortening member (5) to be coupled to a hoisting chain. A portion (1e) of the ring member is flattened so as to fit snugly into an insertion opening (6) leading to a hook portion (3) of the chain coupling or shortening member (5). Hereby, the closed ring member (1) and the chain coupling or shortening member (5) can be securely connected directly to each other.

7 Claims, 4 Drawing Sheets

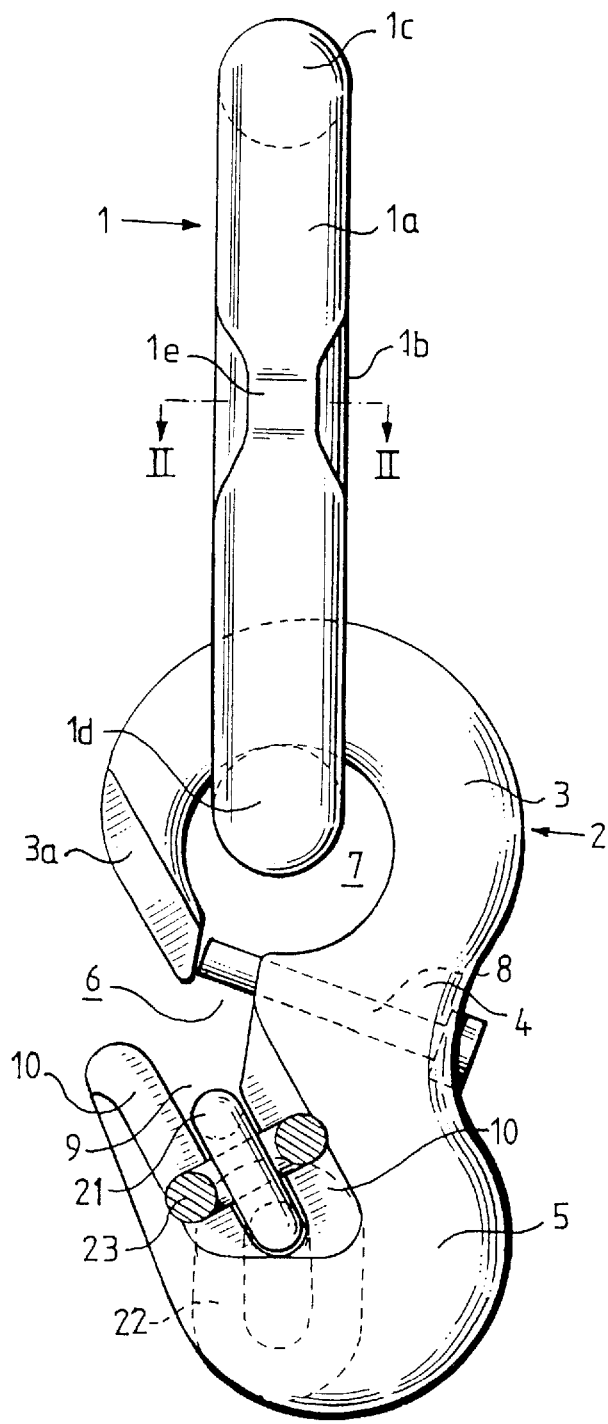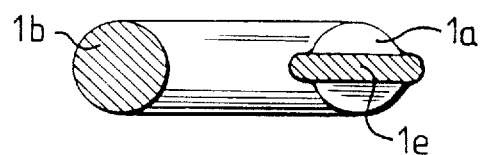

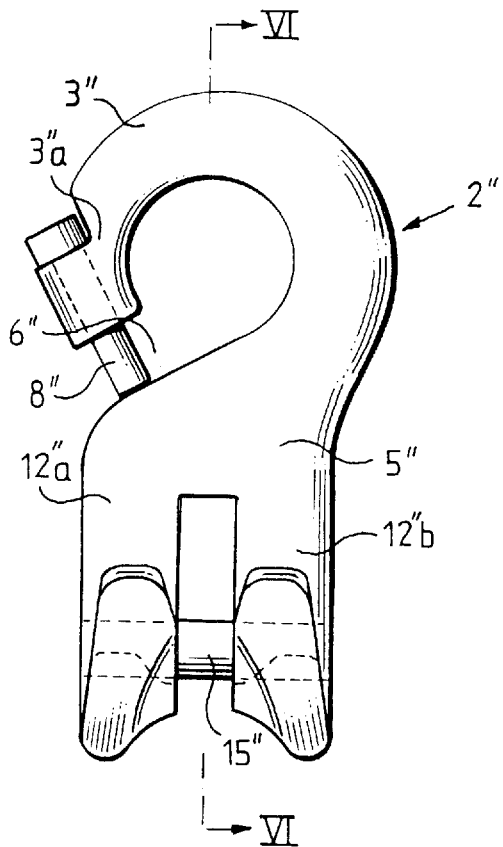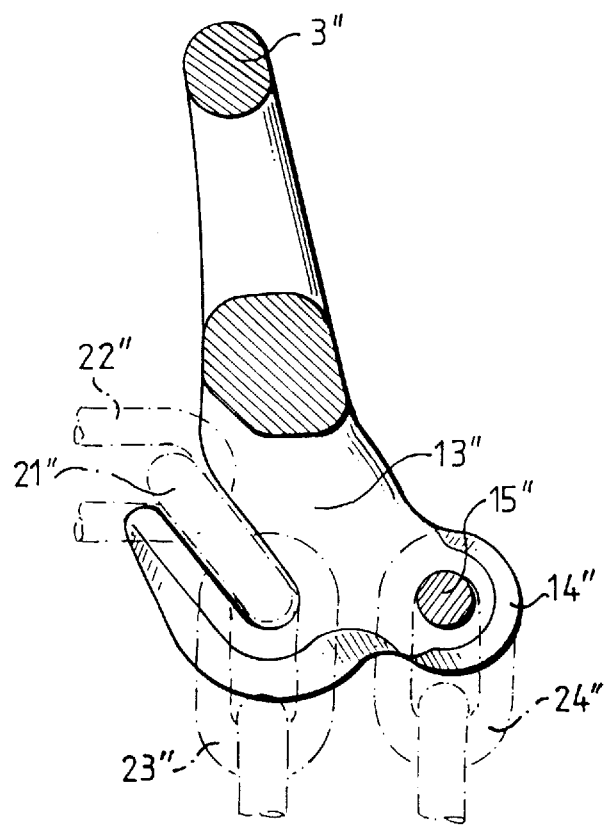

CHAIN COUPLING ASSEMBLY

FIELD OF THE INVENTION

The present invention relates to a chain coupling assembly comprising a closed ring member adapted to be coupled to a hoisting means, such as a crane hook, and at least one chain coupling member having a shank portion adapted to be securely connected to the closed ring member and a chain coupling portion adapted to be coupled to at least one hoisting chain.

PRIOR ART

Chain coupling assemblies of this general kind, in particular including shortening clutches, shortening hooks or grab hooks, are known in many configurations and embodiments. See, e.g., WO83/03649. However, the chain coupling or shortening member is normally connected to the closed ring member (often denoted master link) by means of a separate shackle or a similar detachable member, so that the total assembly is rather complicated, elongated and costly since it consists of at least three different members, viz. the closed ring member, a separate connection member and a shortening or coupling member. Frequently, two, three or even four hoisting chain slings or branches are coupled to one master link. Then, the number of coupling components becomes very large.

SUMMARY OF THE INVENTION

The object of the invention is to provide a simpler, more compact and less expensive chain coupling assembly. This object is achieved in that at least one portion of the closed ring member has a flattened, non-circular cross-section and in that the shank portion of said at least one chain coupling member comprises a hook part for securely engaging the closed ring member directly, said hook part having an insertion opening facing generally towards said chain coupling portion and being dimensioned to snugly receive said one portion of said closed ring member when the latter is inserted into said hook portion.

Thus, the chain coupling member can be securely connected directly to the closed ring member, i.e. without any intermediary connection member such as a shackle. The assembly is therefore relatively short and is rather simple and inexpensive.

Further suitable features will appear from the detailed description below. As appears, the invention also concerns a chain coupling member as such, for use together with a closed ring member.

The invention will now be explained more fully with reference to the appended drawings illustrating some preferred embodiments.

BRIEF DESCRIPTION OF THE DRAWINGS

FIG. 1 shows, in a side view, a chain coupling assembly according to the invention including a closed ring member and a chain coupling member securely connected to the ring member;

FIG. 2 is a sectional view along the line II—II in FIG. 1;

FIG. 5 shows, in a side view, a third embodiment of the chain coupling member;

FIG. 6 is a sectional view along the line VI—VI in FIG. 5, including a portion of a chain;

DETAILED DESCRIPTION OF THE DRAWINGS

Figure 3:
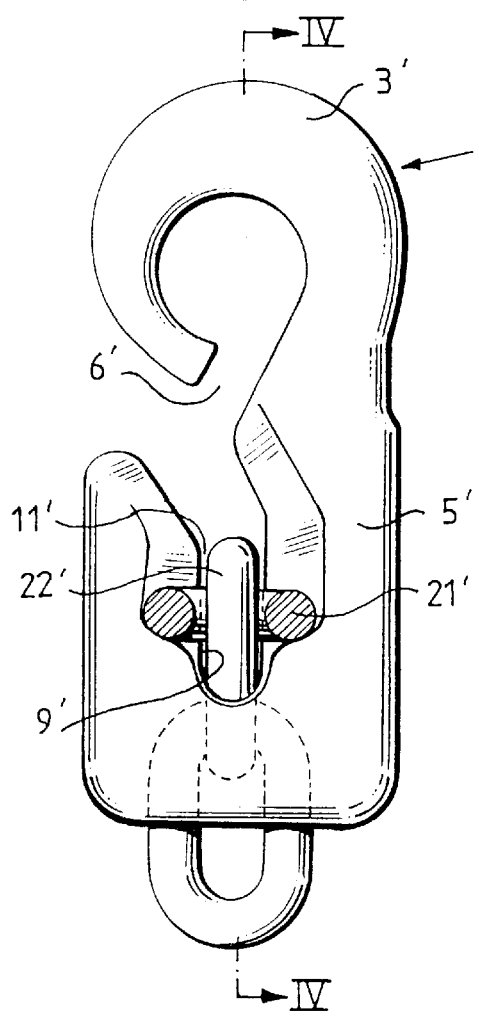
FIG. 3 shows, in a side view, a second embodiment of the chain coupling member.

The assembly shown in FIG. 1 includes an upper, closed ring member or link 1 and a lower, chain coupling member 2. The closed link 1 has the form of an oval ring with two longer side portions 1a, 1b and two curved end portions 1c, 1d. The link 1 is made of an elongated iron blank which is forged into an oval configuration and welded at the ends so as to join the latter into a closed ring. At the middle of the longer side 1a, the material is flattened by forging. Hereby, a narrow portion 1e with a flat, elongated, non-circular cross-section is formed.

The cross-sectional area is substantially the same at the narrow portion 1e as at the other portions. Consequently, the strength of the material is substantially the same at both longer sides 1a, 1b of the closed link 1.

The chain coupling member 2 in FIG. 1 comprises an upper hook portion 3, a middle portion 4 and a lower chain grabbing portion 5 serving as a shortening device. The hook portion 3 is formed as an arcuate loop having a free end 3a located opposite to the middle portion 4 and defining an insertion opening 6 therebetween. The insertion opening 6 leads into the interior opening 7 of the hook portion 3 and is dimensioned to snugly receive the flattened portion 1e of the closed link 1. Thus, the link 1 can be laid down with its longer side 1a and the flattened portion 1e adjacent to the insertion opening 6, whereupon it can be entered into the interior opening 7. To do this, a spring-biassed locking pin 8 is retracted so as to provide a free passage along the insertion opening 6. Finally, the link 1 is swung into the upright position shown in FIG. 1, where the curved portion 1d is securely held in place in the interior opening 7 of the hook portion 3.

Figure 4:
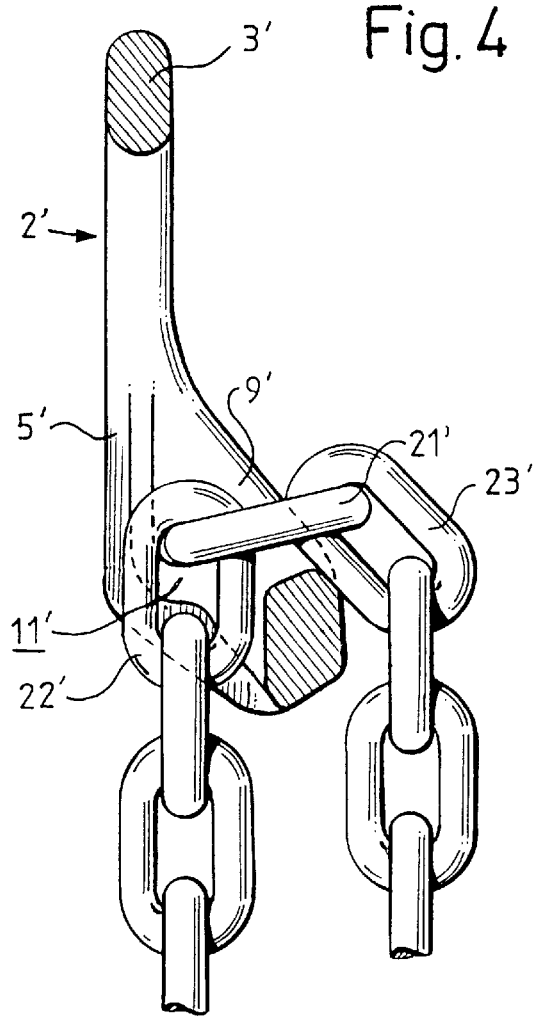
FIG. 4 is a sectional view along the line IV—IV in FIG. 3.

The lower, chain grabbing portion 5 of the member 2 includes a slot 9, which accommodates and supports a central chain link 21, and adjoining recess surfaces 10 with which the adjoining links 22 and 23 engage so as to hold the chain link 21 in a well-defined central position. In the second embodiment of the chain coupling member 2', shown in FIGS. 3 and 4, the upper hook portion 3' is similar to the one shown in FIG. 1, although there is no locking pin in the insertion opening 6'. Thus, the latter faces generally towards the chain grabbing portion 5'. The member 2' serves as a shortening device in this case as well.

The chain grabbing portion 5' is slightly different in that the centrally located chain link 21' is accommodated in a flat, almost horizontal position (when the member 2' is upright as shown) in a cradle or pocket-like recess 9'. At one side thereof, to the left in FIG. 4, there is a central slot 11' for accommodating an adjoining link 22' standing upright and at the other side, to the right in FIG. 4, there is a minor recess for supporting the other adjoining link 23'.

Another example, viz. a third embodiment of the chain coupling member 2" is shown FIGS. 5 and 6. In this case as well, the upper hook portion 3" is basically similar to the one shown in FIG. 1, although the insertion opening 6" faces obliquely sideways (to the left in FIG. 5). A locking pin 8" is mounted at the free end portion 3" a of the hook portion 3".

The chain grabbing portion 5" consists of a fork-like structure with two parallel legs 12"a, 12"b defining a cradle or pocket-like recess 13" shaped so as to accommodate a central chain link 21" and adjoining links 22", 23" in well-defined positions as shown in FIG. 6. At a front end 14" of the fork like structure with the legs 12"a, 12"b, there is a transverse, detachable anchoring pin 15". The latter extends between the legs 12"a, 12"b through an end link 24" of the chain. Hereby the end link 24" is securely connected to the chain grabbing portion 5". A chain loop is formed between the links 23" and 24" and can easily be shortened or lengthened as desired.

Figure 7:
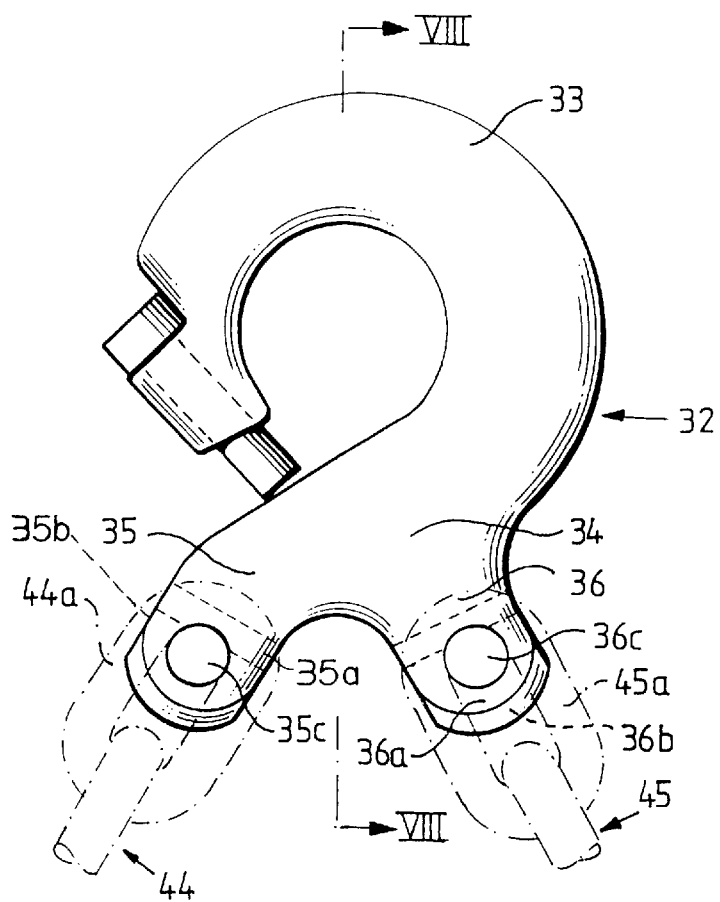
FIG. 7 shows, in a side view, a fourth embodiment of the chain coupling member.
Figure 8:
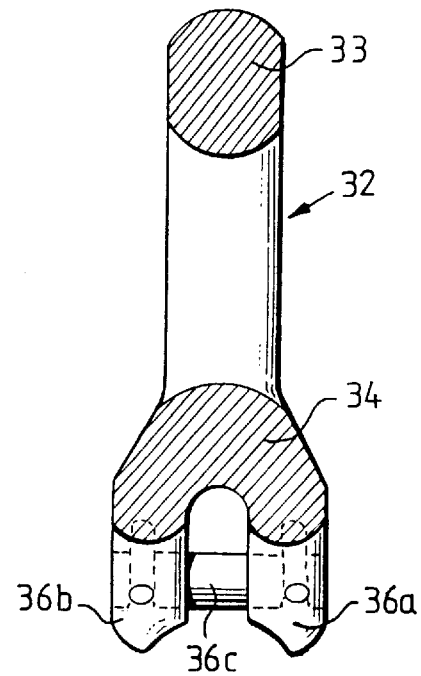
FIG. 8 is a sectional view along the line VIII—VIII in FIG. 7.

The chain coupling member 32 shown in FIGS. 7 and 8 has a shank or hook portion 33, which is quite similar to the one (3") shown in FIG. 5. The lower, chain coupling portion 34, on the other hand, is different in that it is provided with two anchoring means for anchoring the respective end links 44a, 45a of two separate chain branches 44 and 45, respectively.

The lower portion 34 includes two downwardly extending projections 35 and 36, each such projection 35, 36 being formed as a fork with two parallel legs 35a, 35b and 36a, 36b, respectively. An anchoring pin 35c, 36c is detachably mounted between the respective legs so as to securely hold the respective end link 44a, 45a in place therebetween.

The illustrated embodiments may be modified within the scope defined by the appended claims. For example, the closed link or ring member may have several portions with a flattened cross-section. Alternatively, the ring member may have a non-circular, flat cross-section all around it, i.e. at all portions thereof. Such a cross-section may be rectangular, with slightly bevelled corners, ellipsoidal or elongated in some other way. Preferably, the hook portion of the chain coupling member is formed with an internal curvature adapted to the cross-sectional dimensions of the closed ring member. The chain coupling or grabbing portion of the chain coupling member may be provided with two recesses or pockets instead of or in addition to the two anchoring means shown in FIG. 7, whereby two shortenable chain branches may be coupled to the same coupling member. Furthermore the assembly may include two, three or even more chain coupling members, so that the ring member is securely connected to a corresponding number of chain slings, loops or branches.

I claim:

1. A chain coupling assembly for coupling a hoisting means to a respective hoisting chain, said chain coupling assembly comprising:

a closed ring member for coupling to said hoisting means;

a unitary chain coupling member having a hook portion for direct connection to said closed ring member and having a chain grabbing portion for direct coupling to said respective hoisting chain; and at least one portion of said closed ring member having a flattened, non-circular cross-section and said hook portion of said unitary chain coupling member having an insertion opening facing generally towards said chain grabbing portion and being dimensioned to snugly receive said at least one portion of said closed ring member upon insertion of said closed ring member into said hook portion;

wherein said chain grabbing portion of said unitary chain coupling has a recess for accommodating and holding a link of said hoisting chain in a well-defined position enabling said hoisting chain to be shortened and lengthened.

2. A chain coupling assembly as defined in claim 1, wherein said closed ring member has a substantially circular cross-section at all portions except for said at least one portion.

3. A chain coupling assembly as defined in claim 1, wherein said at least one portion is located at the midpoint of one of two longer sides of said closed ring member.

4. A chain coupling assembly as defined in claim 1, wherein said unitary chain coupling member includes a locking means for closing said insertion opening upon insertion of said closed ring member into said hook portion.

5. A chain coupling assembly as defined in claim 1, wherein said chain coupling portion (34) of said at least one coupling member (33) comprises at least one anchoring means (35c, 36c) for anchoring an end link (44a, 45a) of said at least one hoisting chain (44, 45).

6. A chain coupling assembly as defined in claim 5, wherein said chain coupling portion (34) is provided with two or more anchoring means (35c, 36c), each for anchoring an end link (44a, 45a) of an associated hoisting chain (44, 45).

7. A unitary chain coupling member for use together with a closed ring member, said closed ring member including at least one portion having a flattened, non-circular cross-section, said chain coupling member comprising:

a chain grabbing portion for direct coupling to a hoisting chain; and a hook portion for direct connection to said closed ring member, said hook portion having an insertion opening facing generally towards said chain grabbing portion and being dimensioned to snugly receive said at least one portion of said closed ring member.

* * * * *